(12) United States Patent
Obrador et al.

(10) Patent No.: US 7,860,319 B2
(45) Date of Patent: Dec. 28, 2010

(54) IMAGE MANAGEMENT

(75) Inventors: Pere Obrador, Mountain View, CA (US); Peng Wu, San Jose, CA (US); Jonathan Yen, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 553 days.

(21) Appl. No.: 11/127,698

(22) Filed: May 11, 2005

(65) Prior Publication Data
US 2007/0030364 A1 Feb. 8, 2007

(51) Int. Cl.
*G06K 9/62* (2006.01)

(52) U.S. Cl. ............. 382/224; 348/231.2; 382/100

(58) Field of Classification Search ........... 382/224, 382/145, 207, 276; 348/241, 231.2
See application file for complete search history.

(56) References Cited

U.S. PATENT DOCUMENTS

| | | | |
|---|---|---|---|
| 4,492,452 A | 1/1985 | Suzuki et al. | |
| 5,832,055 A * | 11/1998 | Dewaele | 378/62 |
| 6,539,177 B2 | 3/2003 | Parulski | |
| 6,791,619 B1 * | 9/2004 | Misawa | 348/374 |
| 7,042,564 B2 * | 5/2006 | Shoham et al. | 356/237.2 |
| 7,149,342 B2 * | 12/2006 | Biazik et al. | 382/148 |
| 7,444,068 B2 * | 10/2008 | Obrador | 386/117 |
| 2002/0135680 A1 * | 9/2002 | Haruki | 348/207.2 |
| 2003/0063198 A1 * | 4/2003 | Yokokawa | 348/231.2 |
| 2003/0207519 A1 * | 11/2003 | Pnueli et al. | 438/200 |
| 2004/0028267 A1 * | 2/2004 | Shoham et al. | 382/141 |
| 2004/0120571 A1 * | 6/2004 | Duvdevani et al. | 382/149 |
| 2004/0223639 A1 * | 11/2004 | Sato | 382/145 |
| 2005/0075841 A1 * | 4/2005 | Peles et al. | 702/185 |
| 2005/0157848 A1 * | 7/2005 | Miyauchi et al. | 378/207 |
| 2006/0159367 A1 * | 7/2006 | Zeineh et al. | 382/276 |
| 2007/0263897 A1 * | 11/2007 | Ong et al. | 382/100 |

FOREIGN PATENT DOCUMENTS

WO  WO03/069559  8/2003

* cited by examiner

*Primary Examiner*—Daniel G Mariam
*Assistant Examiner*—Aklilu K Woldemariam

(57) ABSTRACT

There is disclosed a method of processing a digital image, which includes assigning an image quality classification to the image on the basis of an analysis of at least a portion of the image to detect whether one or more defects exist in the image.

29 Claims, 2 Drawing Sheets

IMAGE MANAGEMENT

FIELD OF THE INVENTION

The present invention relates to the management of digital images.

BACKGROUND OF THE INVENTION

With the proliferation of digital image capture devices such as digital cameras, digital camcorders and cell phone cameras, increasing numbers of digital images are being captured. There have been a range of efforts undertaken to make it easier for users of digital image capture devices to manage their image collection by providing devices and software that functions enable searching and retrieval of images, and rendering of images on different media such as in hard copy or as a digital slide show etc.

The rapid uptake of digital image capture devices has resulted in relatively inexperienced or unsophisticated users having access to digital image capture devices. Due to a lack of experience and skill a relatively large proportion of images taken by these users often have a low quality. Common quality issues arising may include poor focus or exposure control. The presence of images with these and other quality issues can give rise to certain problems in digital image management, including:

- images having quality issues are involved in every organizing, browsing, searching or retrieving operation performed by the user and they also occupy memory storage. However, because of their low quality they are rarely considered appropriate candidates for image sharing and rendering.
- some of the quality issues may be able to be corrected by the application of an appropriate image enhancement processes however, many users do not possess the knowledge of which enhancement tools are available to correct defects in the image.

SUMMARY OF THE INVENTION

In a first aspect there is provided a method of processing a digital image, which includes assigning an image quality classification to the image on the basis of an analysis of at least a portion of the image to detect whether one or more defects exist in the image.

BRIEF DESCRIPTION OF THE DRAWINGS

Embodiments of the present invention will now be described by way of non-limiting example with reference to the accompanying drawings, in which.

DETAILED DESCRIPTION OF THE EMBODIMENTS

The embodiments described herein are based on the concept that it is desirable to reduce the number of images that possess image capture defect at an early stage of the image management process. Moreover, an image that has no defects should be given a better chance to be included in the image management process than one that includes one or more defects. This principle can be extended such that an image with a defect that can be rectified should have a greater chance of being included in the image management process than an image with a defect which is not rectifiable. Accordingly, in the embodiments described herein a classification process is performed which essentially provides a user of an image management process guidance as to whether to keep, enhance or delete images. Furthermore, by employing suggestive labelling along with the image classifications the user of the image management process is guided in how to deal with a particular image rather than being told that a particular image has one or more defects.

Figure 1:
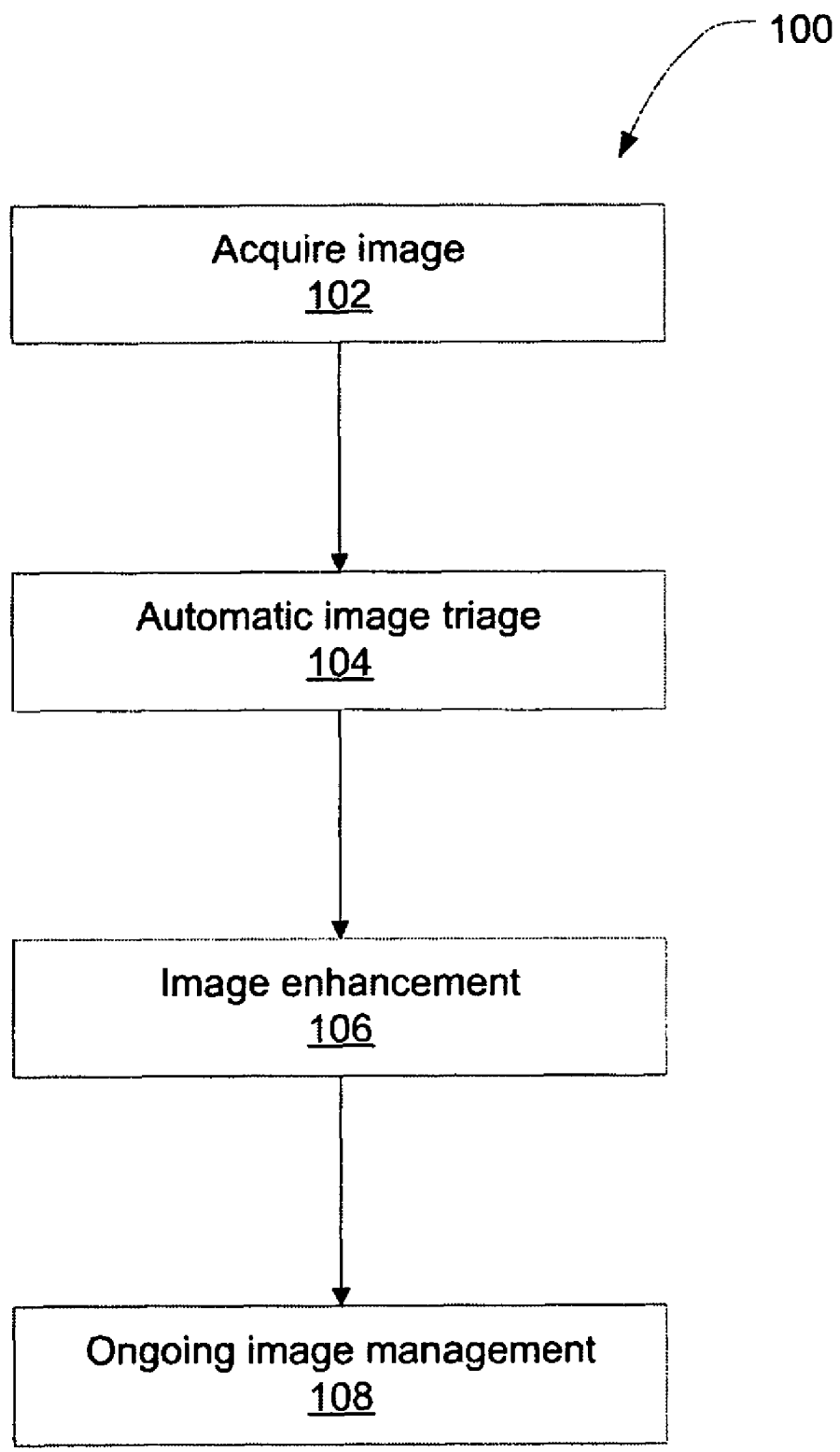
FIG. 1 depicts a flow chart showing an overview of an image management process in accordance with a first embodiment.

FIG. 1 depicts a flow chart showing four phases of an image management process in accordance with the first embodiment. The image management process 100 begins with an acquisition phase 102. Image acquisition can take many forms including, capturing an image with a digital capture device such as a digital camera or a digital camcorder or the like, transfer of an image file from storage media or the acquisition of an image file via a computer network. Other methods for acquiring an image will be known to those skilled in the art.

The next phase of the image management process 100 is an automatic image triage phase 104. In the automatic image triage phase 104, acquired images are analysed according to one or more defect detection criteria to detect whether each image includes detectable image defects and how strong such defects are. Images are also analysed to determine whether they are a duplicate of another image. On the basis of this analysis the images are assigned to a class indicative of the extent and nature of any defects present and/or whether or not they are a duplicate image.

The next phase of the image management method 100 is an image enhancement phase 106. In the image enhancement phase 106 images which include defects that can be rectified or ameliorated to an acceptable extent are enhanced and images which are irreparable are deleted without enhancement being attempted upon them. The image enhancement process conducted in the image enhancement phase 106 can either be performed automatically or be conducted by providing a user of the image management process 100 with a guided user interface to assist in the enhancement of each image.

After image enhancement, images that are of an acceptable quality continue in the image management process for any ongoing image management steps 108. As will be appreciated the ongoing image management phase 108 can include such processes as publication on a website or printing of a hard copy of the image etc.

Figure 2:
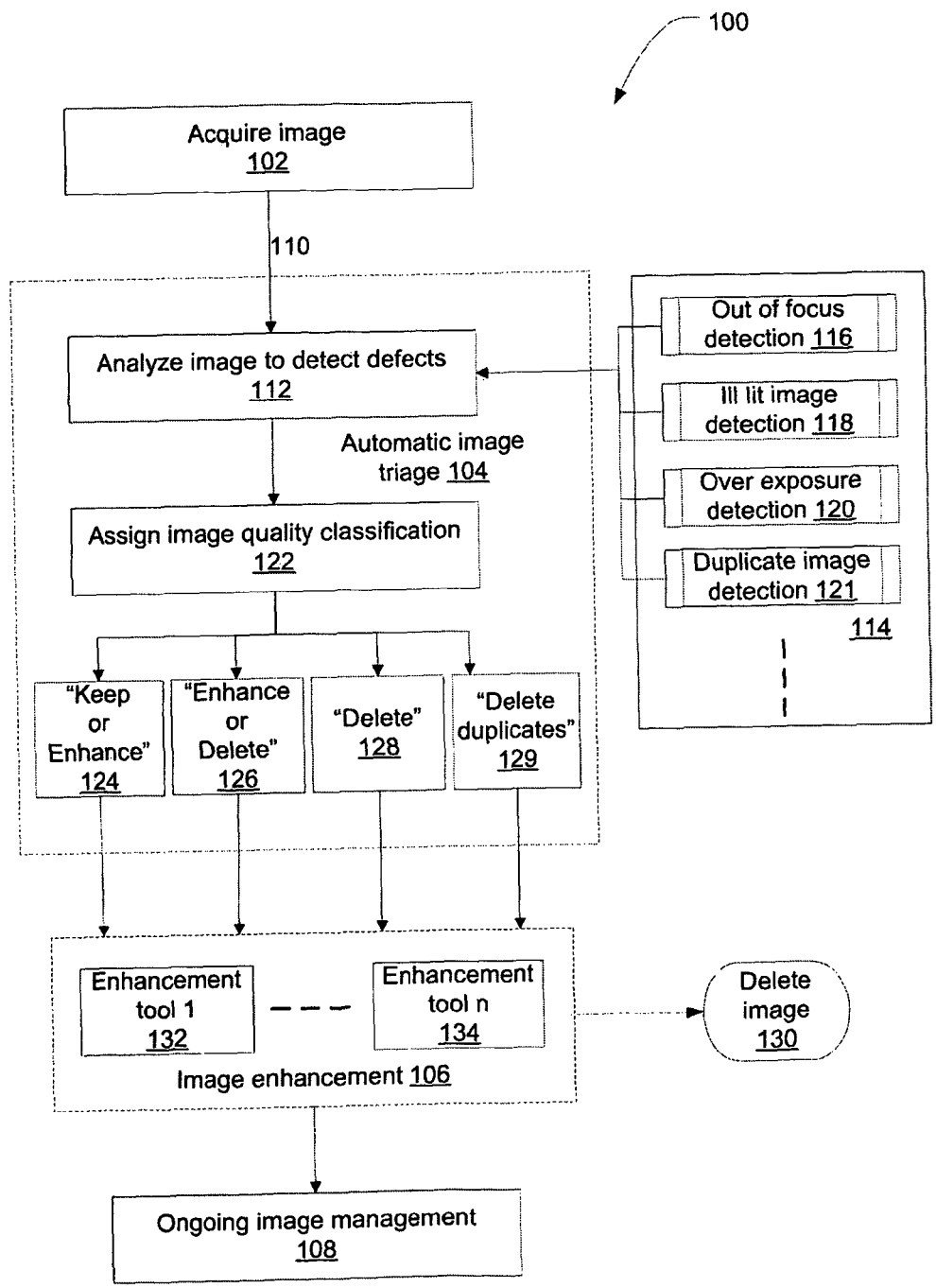
FIG. 2 depicts a more detailed view of the image management process of the embodiment of FIG. 1.

FIG. 2 is a more detailed view of the automated image triage stage 104 and image enhancement stage 106 of the image management process 100. The image triage phase 104 takes captured image as an input 110 and analyses the image against one or more defect detection criteria 114. The defect detection criteria 114 can include, but are not limited to, an out of focus detection criterion 116, an under exposure image detection criterion 118, an image over exposure detection criterion 120. In general, the defect detection criteria are set on the basis of one or more of the following factors:

- the nature of one or more detected defects
- the extent of one or more detected defects
- the severity of one or more detected defects
- the extent to which one or more of the detected defects can be rectified
- availability of a tool to rectify detected defects.

On the basis of a combination of one or more defect detection criteria an image quality classification is assigned 122. A duplicate image detection criterion 121 is also applied to determine whether each image is a duplicate image. In an embodiment, to reduce processing requirements the duplicate detection algorithm is only run on neighbouring pairs of images. That is, an image is checked for duplication only against the image taken immediately preceding it.

In this embodiment, the image analysis step 112 results in an image quality score being generated for each image which in step 122 is used to classify the image into one of three image classes. The image classes are given a name suggestive of the action to be performed by the user in relation to the image rather than for the image quality status of the image. As an illustration of this principle, the image quality classes in the present embodiment are "keep or enhance" 124, "enhance or delete" 126 and "delete" 128 rather than more technical categories which may reflect defects present in the images such as "in focus", "questionable focus" or "out of focus" or "over exposed", "properly exposed" or "under exposed". By using this suggestive labelling, the user is encouraged to retain and apply further image management process to those images in the "keep or enhance" class 124 and the "enhance or delete" class 126, but are encouraged to delete images in the "delete" class 128 without further processing.

When duplicate images are detected, all images in the group of duplicate images are analysed for defects, and the "worst" images i.e. the images with the most severe defects, are assigned to the "delete duplicates" class 129. Only the best one of the group of images (i.e. the image with the least severe defects or the most easily rectified defects) is classified as per the standard method.

In certain embodiments, images in the "delete" and/or "delete duplicates" classes are hidden from the user, and thereby effectively bypass the ongoing image processing steps. In this way the resources expanded on processing/storing these less desirable images are minimized.

In this embodiment, the results of the image analysis 104 are appended to the images as metadata to facilitate the automatic or guided image enhancement of the image. For example, an image assigned to the "keep or enhance" class 126 can be represented by the following metadata structure;

```
<image source="xxx.jpg" ID=xxxx >
    <Bucket Label> "Keep or Enhance"</Bucket Label>
    <CaptureQuality score= 0 ></CaptureQuality>
    <Out-of-focus detectioncondition="OnCamera"
detectionperformed=True(or False)>
        <detected value = False (or True)>
        <score value = 0>
        <fixable value = True (or False)>
    </Out-of-focus>
    <Ill-lit detectioncondition="OnDockiingStation"
detectionperformed=True>
        <detected value=False(or True)>
        <score value=0>
        <fixable value=True(or False)>
    </Ill-lit>
    ...
</image>
```

In the metadata example given above, if a defect is detected, a score is allocated that is reflective of the severity of the defect. This score can be a quantity between 0 (signifying no defect) and 255 (signifying the most severe defect). Thus, in this example a lower "capture" quality score indicates that fewer defects are detected in the image. Alternatively the system can be implemented such that the lower the score the less desirable/reparable an image is.

Furthermore, the "fixable" attribute indicates whether image enhancement tools are available to rectify or ameliorate that defect. The metadata structure also indicates which device has conducted the image analysis e.g. the camera or docking station, or other device. As can be seen from the above example, the image analysis is able to be performed across multiple devices.

In the image enhancement phase 106, one or more image enhancement tools or applications 132, 134 are used to enhance an image. As will be appreciated there is an association between a particular defect type and an enhancement technique used to rectify the defect.

In a first embodiment, the image enhancement phase 106 is performed automatically. In this embodiment, if the metadata associated with an image indicates that a particular type of defect is present, an associated image enhancement tool e.g. tool 132, is initiated automatically and conducts an enhancement process on an image. Depending upon the user's preferences the images enhanced during the image enhancement process can be either overwritten by the newly enhanced image in storage or the newly enhanced image can be stored as a duplicate for later review by the user. For example, the user may determine that images in the "keep or enhance bucket" should be automatically enhanced and only the enhanced image is stored. Images in the "delete" class 128 and "delete duplicates" class 129 may be automatically deleted 130 (or hidden from the user) Images in the enhance or delete bucket 125 can have the enhances version of the image stored separately to the original image. In this way, even though enhancement is automatic the user has the opportunity to choose whether or not he or she gets to vet the results of the image enhancement. Prior to deletion the user may be prompted to confirm that the images classified in the delete class 128 and the delete duplicates class 129, should be deleted.

In an alternative embodiment, the image enhancement phase 106 can employ a use interface to guide the user through image enhancement. In this guided image enhancement mode the user interface guides the user though the image enhancement process by displaying the enhancement result and receiving the user's feedback on whether the original images or the corresponding enhanced images should be returned. Furthermore, the user interface may make suggestions and provide guideline about image enhancement techniques which can be used to rectify particular defects and guide the user in how to use those tools. The user interface can also allow the user to choose which image(s) in a group of duplicates should be retained.

In the event that a particular defect is detected but no image enhancement tool is available for rectifying or ameliorating the defect if the user interface can be configured to indicate to a user possible sources from which suitable images enhancement tool can be obtained. Images which have been classified in the delete class 128 are presented to the user prior to deletion so as to allow the user the ability to approve of their deletion.

Advantageously, in embodiments employing the metadata structure described above, a user is provided with the ability to sort images into groups according to the type of defect which is present in each image. This makes batch enhancement of a group of images possible. In such an embodiment, the user interface is configured to tell the user what type of defect is present in the image.

As will be appreciated, by providing means to characterise image quality and guide a user or automatically provide image enhancement, the occurrence of images with defects is reduced and images with defects have less potential to be rendered or archived. This reduces storage space and computation power in performing ongoing management tasks with the images.

It should also be noted that the embodiments described above by using a metadata structure of the type described the image enhancement process is given a degree of flexibility not available in prior art systems. In this regard, the defect or duplicate image detection can be performed on a different computing device to the image enhancement. For example, defect or duplicate image detection can happen in the camera at image capture time or on a camera docking station during the image download time or even in a combination of both. By maintaining a flexible metadata structure that records whether an image quality analysis has been performed and under what conditions the analysis has been performed, it is possible to conduct different steps of the image management process on different hardware and/or software as each image has a self contained record of its quality status.

It will be understood that the embodiments disclosed and defined in this specification extends to all alternative combinations of the individual features mentioned or evident from the text or drawings. All of these different combinations constitute various alternative aspects of the embodiments.

The invention claimed is:

1. A computer-implemented method of processing a digital image, comprising operating a processor to perform operations comprising:
   determining an image quality metric score based on an analysis of at least a portion of the digital image and without regard to any other image;
   selecting an image management recommendation label from a set of image management recommendation labels based on the image quality metric score and without regard to information derived from any image other than the digital image, wherein each of the image management recommendation labels connotes a respective suggestion for managing the digital image; and
   outputting the selected image management recommendation label in association with the digital image.

2. The method of claim 1, wherein the determining comprises determining the image quality metric score based on an analysis of at least a portion of the digital image in terms of at least one of image focus quality, image lighting quality, and image exposure quality.

3. The method of claim 1, further comprising operating the processor to perform operations comprising detecting an image quality defect in the digital image, and wherein the selecting comprises selecting the image management recommendation label based on an availability of an image enhancement tool associated with reparation of the detected image quality defect.

4. The method of claim 1, further comprising operating the processor to perform operations comprising incorporating the image quality metric score into a metadata structure associated with the digital image.

5. The method of claim 1, wherein each of the image management recommendation labels connotes a respective suggestion corresponding to one or more of: delete the digital image; enhance the digital image; keep the digital image; print the digital image; crop the digital image; re-take the digital image; send the digital image; and archive the digital image.

6. The method of claim 1, further comprising operating the processor to perform operations comprising automatically enhancing the digital image in response to a determination that the image quality metric score indicates that the digital image has a reparable image quality defect.

7. The method of claim 1, further comprising operating the processor to perform operations comprising automatically deleting the digital image in response to a determination that the image quality metric score indicates that the digital image has an irreparable image quality defect.

8. The method of claim 1, further comprising operating the processor to perform operations comprising:
   detecting an image quality defect in the image;
   identifying an image enhancement process that is associated with the detected image quality defect; and
   depending on the selected image management recommendation label, automatically enhancing the digital image in accordance with the identified image enhancement process.

9. The method of claim 1, wherein the outputting comprises presenting the selected image management recommendation label in a user interface.

10. The method of claim 1, further comprising operating the processor to perform operations comprising,
    in response to a determination that the digital image contains one or more image quality defects, displaying a user interface presenting one or more options for enhancing the digital image.

11. The method of claim 1, further comprising operating the processor to perform operations comprising,
    in response to a determination that the digital image contains one or more irreparable image quality defects, displaying a user interface presenting an indication that the digital image contains one or more irreparable image quality defects in association with a user- selectable option to delete the digital image.

12. The method of claim 1, further comprising operating the processor to perform operations comprising,
    in response to a determination that the digital image contains a reparable image quality defect, displaying a user interface presenting an indication of the reparable image quality defect in association with a user-selectable option to execute an image enhancement process for repairing the image quality defect.

13. The method of claim 1, further comprising operating the processor to perform operations comprising:
    determining an image quality defect type present in the digital image; and
    assigning the digital image to a group of images based on the determined image quality defect type.

14. The method of claim 13, further comprising operating the processor to perform operations comprising enhancing each of the images assigned to the group in accordance with an image enhancement process associated with the determined image quality defect type.

15. The method of claim 1, wherein the outputting comprises appending to the digital image metadata that is indicative of the selected image management recommendation label.

16. The method of claim 15, wherein the metadata data includes data indicative of at least one of the following:
    a nature of one or more image quality defects that are detected in the digital image;
    an extent of one or more image quality defects that are detected in the digital image;
    a severity of one or more image quality defects that are detected in the digital image: and
    an extent to which one or more image quality defects that are detected in the digital image can be rectified.

17. The method of claim 1, further comprising operating the processor to perform operations comprising determining whether the digital image is a duplicate of another image.

18. The method of claim 17, further comprising operating the processor to perform operations comprising,
in response to a determination that the digital image is a duplicate of the other image, ranking each of the duplicate images in terms of their respective image quality metric scores.

19. The method of claim 18, further comprising operating the processor to perform operations comprising assigning the one of the images ranked lowest to a duplicate image class.

20. The method of claim 18, further comprising operating the processor to perform operations comprising automatically deleting the digital image assigned to the duplicate image class.

21. A computer, comprising:
a processing element operable to perform operations comprising
determining an image quality metric score based on an analysis of at least a portion of a digital image and without regard to any other image,
selecting an image management recommendation label from a set of image management recommendation labels based on the image quality metric score and without regard to information derived from any image other than the digital image, wherein each of the image management recommendation labels connotes a respective suggestion for managing the digital image, and
outputting the selected image management recommendation label in association with the digital image.

22. A non-transitory computer-readable medium storing computer-readable instructions causing a computer to perform operations comprising:
determining an image quality metric score based on an analysis of at least a portion of a digital image and without regard to any other image;
selecting an image management recommendation label from a set of image management recommendation labels based on the image quality metric score and without regard to information derived from any image other than the digital image, wherein each of the image management recommendation labels connotes a respective suggestion for managing the image; and
outputting the selected image management recommendation label in association with the digital image.

23. The computer-readable medium of claim 22, wherein the computer-readable instructions cause the computer to perform operations comprising detecting an image quality defect in the digital image based on the image quality metric score, and in the selecting the computer-readable instructions cause the computer to perform operations comprising selecting the image management recommendation label based on an availability of an image enhancement tool associated with reparation of the detected image quality defect.

24. The computer-readable medium of claim 22, wherein the computer-readable instructions cause the computer to perform operations comprising automatically enhancing the digital image in response to a determination that the image quality metric score indicates that the digital image has a reparable image quality defect.

25. The computer-readable medium of claim 22, wherein the computer-readable instructions cause the computer to perform operations comprising automatically deleting the digital image in response to a determination that the image quality metric score indicate that the digital image has an irreparable image quality defect.

26. A computer-implemented method of processing a digital image, comprising operating a processor to perform operations comprising:
determining an image quality metric score based on an analysis of at least a portion of the image and without regard to any other image;
selecting an image management recommendation label from a set of image management recommendation labels based on the image quality metric score and without regard to information derived from any image other than the digital image, wherein each of the image management recommendation labels connotes a respective suggestion for managing the image; and
selecting an image enhancement process based on the selected image management recommendation label; and
generating an enhanced version of the image, wherein the generating comprises applying the selected image enhancement process to the image.

27. The method of claim 26, further comprising operating the processor to perform operations comprising incorporating the selected image recommendation label into meta data associated with the digital image, and wherein the selecting of the image enhancement process comprises determining the selected image recommendation label from the metadata.

28. The method of claim 26, wherein the selecting of the image enhancement process comprises presenting the selected image management recommendation label in a user interface. and receiving user input selecting the image enhancement process via the user interface.

29. The method of claim 1, wherein the outputting comprises displaying the selected image management recommendation label to a user.

* * * * *

UNITED STATES PATENT AND TRADEMARK OFFICE
CERTIFICATE OF CORRECTION

| | | |
|---|---|---|
| PATENT NO. | : 7,860,319 B2 | Page 1 of 1 |
| APPLICATION NO. | : 11/127698 | |
| DATED | : December 28, 2010 | |
| INVENTOR(S) | : Pere Obrador et al. | |

It is certified that error appears in the above-identified patent and that said Letters Patent is hereby corrected as shown below:

In column 6, line 30, in Claim 11, delete "user- selectable" and insert -- user-selectable --, therefor.

In column 6, line 62, in Claim 16, delete "image:" and insert -- image; --, therefor.

In column 8, line 44, in Claim 28, delete "interface." and insert -- interface, --, therefor.

Signed and Sealed this
Twenty-seventh Day of November, 2012

David J. Kappos
*Director of the United States Patent and Trademark Office*